No. 762,256. Patented June 7, 1904.

UNITED STATES PATENT OFFICE.

ROBERT SCHNEIDER, OF BERLIN, GERMANY.

MIXTURE FOR TREATING TUBERCULOSIS.

SPECIFICATION forming part of Letters Patent No. 762,256, dated June 7, 1904.

Original application filed January 29, 1903, Serial No. 141,086. Divided and this application filed May 4, 1903. Serial No. 155,624. (No specimens.)

*To all whom it may concern:*

Be it known that I, ROBERT SCHNEIDER, a subject of the King of Prussia, Emperor of Germany, and a resident of Berlin, Germany, have invented a new and Improved Mixture for Treating Tuberculous and Catarrhal Complaints in Human Beings and Animals, of which the following is a full, clear, and exact description, this being a division of the application for Letters Patent, Serial No. 141,086, filed by me on January 29, 1903, for a process and apparatus for treating tuberculous and catarrhal complaints.

The object of the invention is to provide a new and improved mixture for the successful treatment of tuberculous and catarrhal complaints in human beings and animals.

The mixture consists, essentially, of a powder containing ingredients of eucalyptus, sulfur, and carbon. The ingredients of eucalyptus consist partly of the roots, stems, leaves, blossoms, or seeds of eucalyptus belonging to the myrtle family of plants. The ingredients of these plants or the juices of same hardened to a resinous substance in the air are ground in a dry state to a fine powder. In place of the plants or their juices preparations therefrom can be used. Such a preparation is, for example, the so-called "eucalyptus-oil," which I use, preferably, in performing my invention, especially the variety of oil obtained from *Eucalyptus maculata*, variety *Citriodora*.

The use of the ingredients of eucalyptus in the manner hereinafter described has a particularly quick and favorable effect when a suitable and not too small a quantity of finest ground sulfur and carbon are added to the substances hereinbefore specified.

The following composition has proven satisfactory: powdered eucalyptus-leaves, 7.5; oil of *Eucalyptus maculata*, variety *Citriodora*, 4.5; flowers of sulfur, sixty-three; powdered wood-charcoal, twenty-five; total, one hundred. From these ingredients an exceedingly fine and uniform powder is made and about one to two grams only are so far heated for about twenty to twenty-five minutes on a suitable plate of ceramic substance, that a slow and as uniform as possible development of gas takes place. The patient should stay in the room for at least a few hours per day, or, better, at night, inhaling the air impregnated with the products of combustion of the powder. This is continued for a suitable period. A few weeks at least are necessary for tuberculous complaints.

Having now particularly described and ascertained the nature of my said invention and in what manner the same is to be performed, I declare that what I claim is—

1. The herein-described mixture for the treatment of tuberculous and catarrhal complaints of the air-passages of human beings and animals, consisting of ingredients of eucalyptus and ground sulfur.

2. The herein-described mixture for the treatment of tuberculous and catarrhal complaints of the air-passages of human beings and animals, consisting of ingredients of eucalyptus, ground sulfur and powdered carbon.

3. The herein-described mixture for the treatment of tuberculous and catarrhal complaints of the air-passages of human beings and animals, consisting of powdered eucalyptus-leaves, oil of *Eucalyptus maculata*, flowers of sulfur, and powdered wood-charcoal in about the proportions specified.

In witness whereof I have hereunto signed my name, this 26th day of March, 1903, in the presence of two subscribing witnesses.

ROBERT SCHNEIDER.

Witnesses:
   FRANZ SCHWENTERLEY,
   WOLDEMAR HAUPT.